March 13, 1945.   R. E. BURK   2,371,148
REGENERATION OF CATALYSTS
Filed April 26, 1941
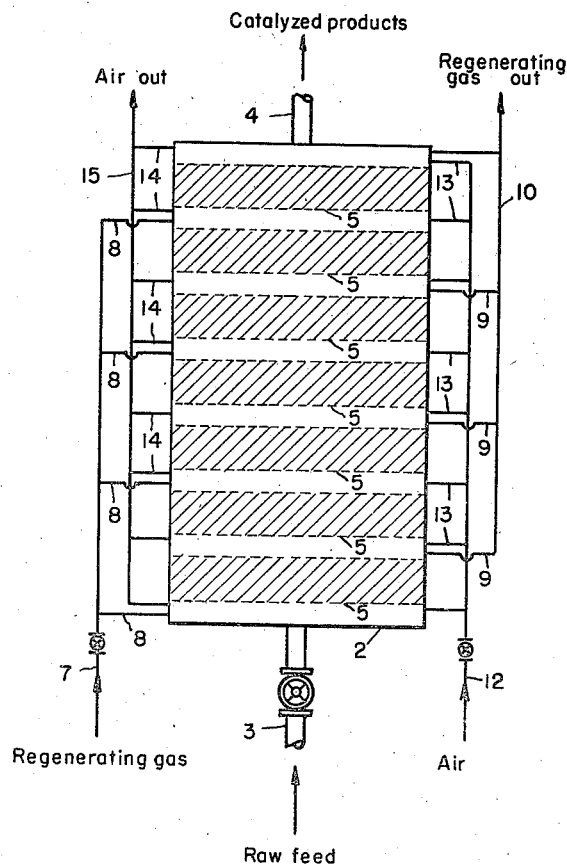
INVENTOR.
ROBERT E. BURK
BY
ATTORNEYS Patented Mar. 13, 1945

2,371,148

UNITED STATES PATENT OFFICE 2,371,148

REGENERATION OF CATALYSTS

Robert E. Burk, Cleveland Heights, Ohio, assignor to The Standard Oil Company, Cleveland, Ohio, a corporation of Ohio Application April 26, 1941, Serial No. 390,583

5 Claims. (Cl. 252—242)

In certain operations with catalysts carbon tends to deposit upon the catalytic surfaces and poison the catalyst, thereby ultimately limiting the length of the run. While the carbon can be removed by combustion, such procedure has involved considerable difficulties by reason of the intensely localized combustion and heating up action and the handicap of attempting to carry off the heat adequately and compensatively such as to prevent localized over-heating and damage. Particularly with oxide catalysts where more than one degree of oxidation is possible, more or less damage to the catalyst has been prone to occur. Various expedients have been proposed for meeting such conditions, and it has been a custom to provide heat exchanger coils in or adjacent to the catalyst masses. In accordance with the present invention, a simplification may be had, and with particularly accurate control throughout. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing the sole figure is a semi-diagrammatic illustration of apparatus arrangement illustrative of the application of the invention.

The present invention is of particular advantage where a catalytic reaction control is adiabatic or exothermic so that heat need not be supplied to the reaction. The catalyst is desirably arranged in rather thin layers, in a suitable container 2, having a valve controlled supply-inlet 3 for the raw material to be catalyzed, and an outlet connection 4 for the catalyzed products. Desirably, the catalyst may be arranged in superposed trays 5 which may be suitably supported and removable. For supplying regenerating gas, the arrangement should be such as to provide a flow through the catalyst, and while there may be a supply to flow through each tray, preferably the connections are provided in a supply system having a valve controlled inlet pipe 7 which opens by branches 8 to alternate spaces between trays, while branches 9 from the intermediate spaces lead to an off-take manifold 10. By this, there is a particularly uniform distribution of regenerating gas to flow through the bodies of catalyst. An independent piping system for cooling gas has a supply inlet 12 with branches 13 to each space between catalyst trays, and branches 14 opposite lead from these spaces to an off-take manifold 15. A flow of gas across the catalyst surfaces without passing through the mass is thus applicable.

In operation, with the catalyst trays 5 containing for example an oxide catalyst such as aluminum and chromium oxides, for instance in 80:20 proportion and of gel type structure, the raw feed, as for instance non-benzenoid hydrocarbons is supplied to the feed connection 3 and the products are taken off by connection 4 after having contacted the catalyst, the desired temperature having been maintained in the catalyst, as for example 750–1200° F. Hydrogen containing gas in proportioned amount is supplied with the feed, and a temperature, pressure and hydrogen to hydrocarbon ratio is adjusted such that the reaction is adiabatic. When the activity of the catalyst declines in deposit of carbon to a predetermined extent, the feed line 3 is shut off and an oxygen-containing regenerating gas, air or air mixed with nitrogen or products of combustion, is supplied through the manifold 12 to pass between the catalyst layers and sweep across the surface of the catalyst masses, thus first oxidizing the surface carbon only, the products proceeding on out through branch connections 14 and exhaust manifold 15. By applying the oxygen-containing gas thus stage-wise, carbon at the surface of the catalyst masses is selectively oxidized and only the heat produced at such portions has to be carried off at one time, and then carbon in the mass can be separately oxidized and only the heat produced there has to be carried off at one time. After the surface oxidation is complete, although the line 12 may be closed and the line 7 opened, it is not in all cases necessary to close the line 12, the controls merely being manipulated that part of the regenerating gas or air is started through the beds or layers of catalyst, while air or the like is also passed between the beds or layers, acting as cooling gas to remove heat. Thus, with the supply manifold 12 still open, the regenerating gas supply manifold 7 is opened and the regenerating gas, air or air diluted with an inert gas, is supplied into the alternate spaces so as to pass through the catalyst bodies and out from the intermediate spaces to the exhaust manifold 10, as with such added air supply and limited carry-off capacity by direct outlets 14, flow can readily occur through the catalyst. The regenerating gas as proceeding through the catalyst bodies incites active oxidation or combustion with abundant heat generation. Primarily however the cooling gas supply coming by the connections 13 into flowing contact with the catalyst surfaces but without going through the mass, exerts an active cooling effect, taking away heat. And thus, by appropriate correlated control of these two factors, one occasioning heat generation and the other effecting a cooling action, the temperature may be controlled with precision. With relatively shallow trays of catalyst body, no portion of the mass is far from active cooling effect, and localized run-away temperature is obviated by the general accuracy of control. It is noticed also that pipe coils for the cooling-liquid as heretofore customary in the art may be eliminated, thus very greatly facilitating the placement of the catalyst and also simplifying the apparatus construction.

Other modes of applying the principle of the invention may be employed, change being made as regards the details described, provided the features stated in any of the following claims, or the equivalent of such, be employed.

I therefore particularly point out and distinctly claim as my invention:

1. In catalyst operation with an oxide-containing catalyst, regenerating the catalyst by first treating the face of the catalyst by flowing oxidizing gas selectively thereacross and then treating the interior by flowing oxidizing gas through the catalyst mass, and preventing undesired temperature rise by passing oxygen-containing gas across the face of the catalyst mass without flowing therethrough.

2. In catalyst operation where hydrogen has been supplied to the catalyst as well as vapors to catalyze and with the catalyst arranged in spaced thin layers, in successive stages first selectively regenerating the surfaces of the layers by passing regenerating gas between instead of through the layers, and then regenerating the interior of the layers by supplying regenerating gas through the layers, and preventing undesired temperature rise resulting from said regeneration by passing added oxygen-containing gas between the layers and across the surfaces thereof in direct contact therewith and acting as a cooling gas to remove heat.

3. In catalyst operation with catalyst arranged in thin layers, regenerating the catalyst by passing oxygen-containing gas across the surface of the catalyst, first oxidizing the carbon which is on the exposed surface of the mass of catalyst, and subsequently oxidizing off the carbon which is in the interior of the catalyst mass by passing oxygen-containing gas through the layers, and conducting away from the exposed surface heat resulting from said carbon oxidation by flowing added oxygen-containing gas thereacross in direct contact therewith, the major portion of the flow of said added oxygen-containing gas passing between instead of through the layers.

4. In catalyst operation with the catalyst arranged in spaced layers, in succession oxidizing off the carbon which is on the exposed surface of the layer of catalyst by flowing gas across the exposed surface, then oxidizing the carbon in the interior of the layer by flowing oxidizing gas through the layer, and cooling the catalyst by direct contact heat exchange consisting of a flow of added heat-removing gas supplied across the exposed surface, without the major portion of said added heat-removing gas passing through the layers.

5. Catalyst apparatus comprising a container, superposed catalyst trays therein with spaces therebetween, the major portion of the spaces being unobstructed by cooling coils, connections for supplying materials to be catalyzed and connections for withdrawing the catalyzed products, means for controlling against undesired temperature rise during regeneration of the catalyst, such means comprising connections to supply regenerating gas to alternate spaces and connections for withdrawing gas from intermediate spaces to cause the gases to flow through at least part of the trays, and independent connections for respectively supplying cooling gas to each of said spaces and for withdrawing said cooling gas therefrom to cause the gases to flow over each tray, whereby cooling coils between the trays are rendered unnecessary and their obstruction to the flow of regenerating gas is avoided.

ROBERT E. BURK.